(No Model.)

F. J. & W. H. HOYT.
ORE PULVERIZER AND AMALGAMATOR COMBINED.

No. 253,051. Patented Jan. 31, 1882.

WITNESSES:
Francis McArdle
A. H. Low.

INVENTOR:
Fred. J. Hoyt,
Wm H. Hoyt,
BY Francis C. Bowen,
ATTORNEY.

UNITED STATES PATENT OFFICE.

FREDERICK J. HOYT, OF NEW YORK, N. Y., AND WILLIAM H. HOYT, OF JERSEY CITY, NEW JERSEY.

ORE-PULVERIZER AND AMALGAMATOR COMBINED.

SPECIFICATION forming part of Letters Patent No. 253,051, dated January 31, 1882.

Application filed June 17, 1881. (No model.)

*To all whom it may concern:*

Be it known that we, FREDERICK J. HOYT and WILLIAM H. HOYT, residing respectively at New York, in the county of New York and State of New York, and at Jersey City, in the county of Hudson and State of New Jersey, have invented a new and useful Improvement in Ore-Pulverizers and Amalgamators Combined, of which the following is a specification.

This invention relates to amalgamating attachments to ore-pulverizers, and is especially adapted to that class of machines for which we filed an application for Letters Patent May 13, 1881, Serial No. 33,275.

It consists in making the lower part of the shell or casing in form of a pan adapted to be supplied with mercury for amalgamating purposes, and combining therewith an annular water-supply pipe, a water-overflow pipe, and an amalgam-discharge spout, as hereinafter more fully set forth.

Figure 1:
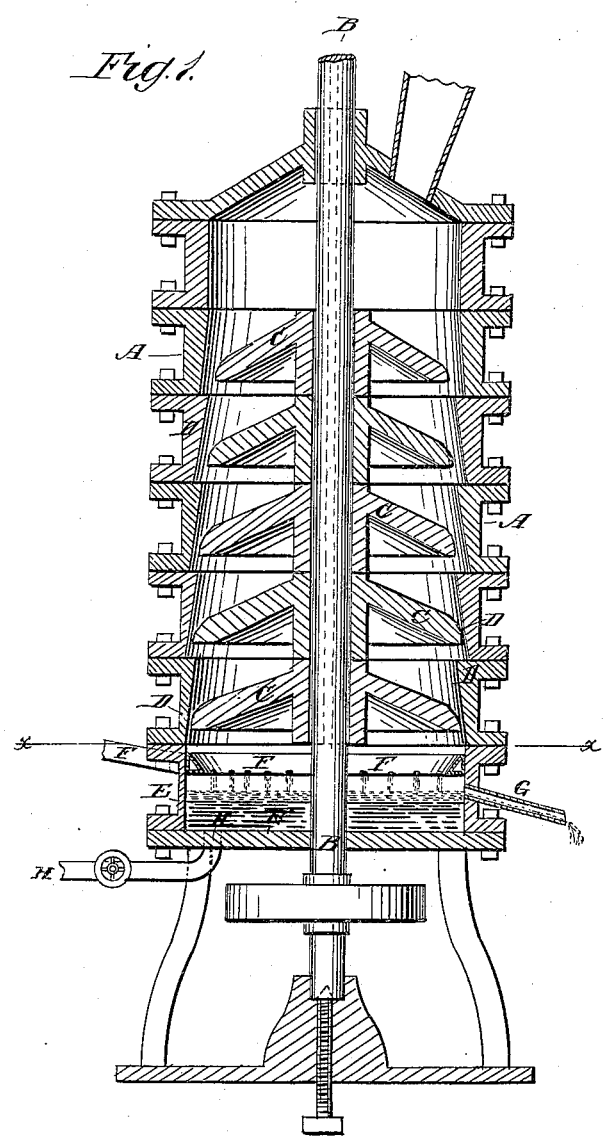
Figure 2:
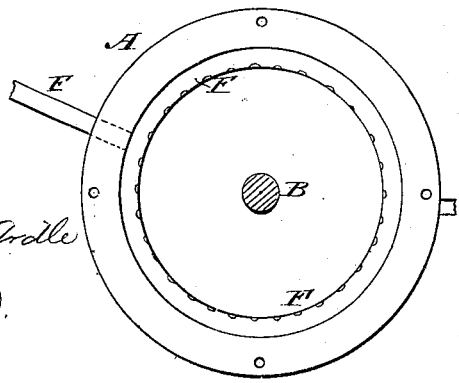

This invention is illustrated in the accompanying drawings, in which Figure 1 represents a vertical central section. Fig. 2 is a horizontal section through line *x x*, Fig. 1.

The letter A designates the shell, composed of a series of detachable sections having flanges whereby they are fastened together. In the center of this shell is arranged a vertical shaft or spindle, B, carrying grinding-disks C, which are beveled upward at their outer edges and co-operate with beveled or tapered grinding-surfaces D, formed on the interior of the shell, the shaft being made adjustable in a vertical direction to permit of regulating the positions of the disks relatively to the grinding-surfaces. The lower section of the shell A is provided with a level or horizontal bottom, forming a pan, E, and in the upper part of this pan is arranged a water-supply pipe, F, while from the side thereof projects a water-overflow pipe, G, and from the bottom thereof a spout, H, for the discharge of amalgam. The water-supply pipe F is annular, extending entirely around the pan E, on the interior thereof, and it is perforated for the escape of water therefrom into the pan, while in order to avoid interference of the supply-pipe with pulverized ore falling from the lower grinding-disk into the pan the pipe is made triangular on cross-section; but this purpose can be accomplished by enlarging the shell-section composing the pan and arranging the supply-pipe to hug its inner surface, or by means of a suitable shed placed over the supply-pipe on the inner surface of the pan, or by arranging the pipe away from the inner surface of the pan, leaving a free space between it and such surface. The water-overflow pipe G is placed at a distance of, say, one inch above the bottom of the pan E, and the amalgam-discharge spout H is provided with a suitable valve or gate.

In applying the apparatus to use we place into the pan E a body of quicksilver, filling it up nearly to a level with the overflow-pipe G and turn on the water to the pan, having shut off the spout H. We then feed in the ore to the grinding-disks, and as the ore leaves the lower disk—being then in a dry powdered state—it falls on the thin layer of water on the top of the quicksilver, continuously overflowing through the pipe G, and the gold, silver, or other mineral gravitates at once through the water into the quicksilver, whereby it is caught or amalgamated, while the quartz or sand floats on the water, and is thus washed away. Then when it is desired to discharge the amalgam we shut off the water and simply open the spout H.

If desired, the water-supply pipe F may be arranged above either of the disks C as an assistant to the process of grinding.

It should be remarked that the amalgamating-pan E and concomitants can be used with grinding-disks of any other form than those described, and hence we do not wish to be confined in this application to any particular form of the disks.

Having thus described our invention, what we claim as new, and desire to secure by Letters Patent, is—

The combination, substantially as hereinbefore set forth, with the vertical shaft and grinding-disks, of the shell constructed with the grinding-surfaces to co-operate with the disks, and with the amalgamating-pan in the lower part, the annular water-supply pipe, the water-overflow pipe, and the amalgam-discharge spout of the pan, for the purpose specified.

In testimony that we claim the foregoing we have hereunto set our hands this 15th day of June, 1881.

FREDERICK J. HOYT.
WILLIAM H. HOYT.

Witnesses:
FRANCIS CLARE BOWEN,
A. H. LOW.